Feb. 25, 1936.  W. A. ZELESNICK  2,031,996
DENTAL CONSTRUCTION
Filed March 17, 1934
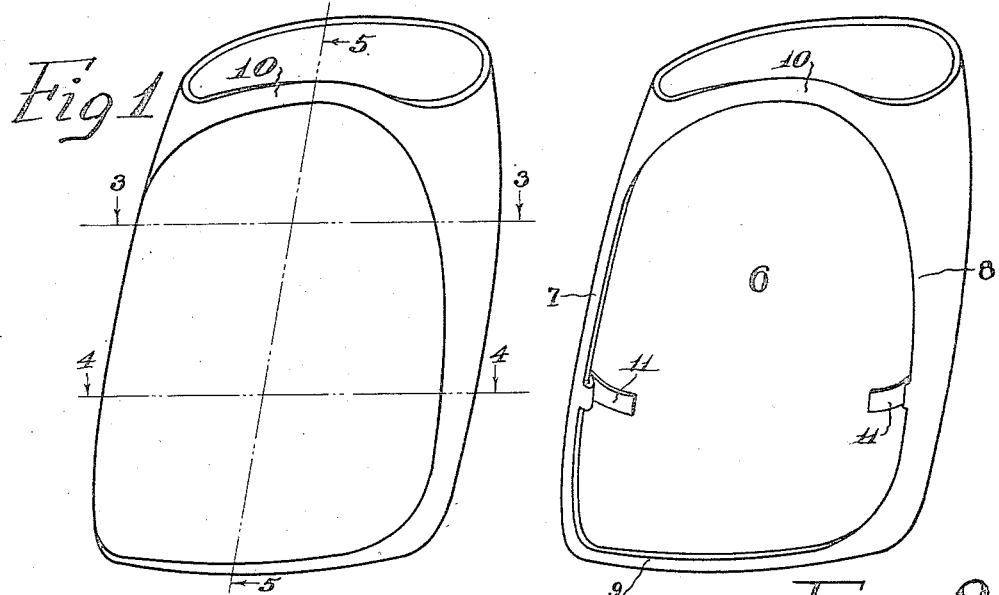
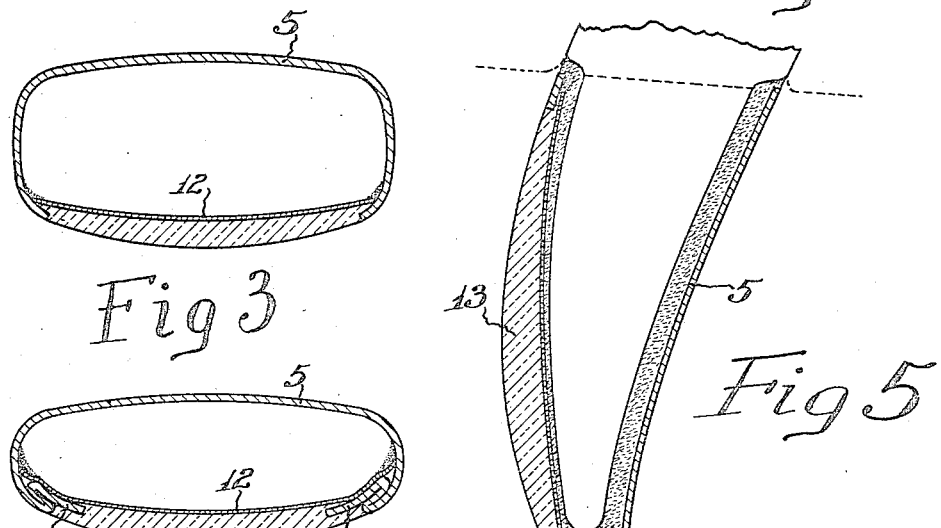
INVENTOR.
WILLIAM A. ZELESNICK.
BY
Leonard L. Kalish
ATTORNEY.

Patented Feb. 25, 1936

2,031,996

UNITED STATES PATENT OFFICE 2,031,996

DENTAL CONSTRUCTION

William A. Zelesnick, Philadelphia, Pa.

Application March 17, 1934, Serial No. 716,033

1 Claim. (Cl. 32—29)

My invention relates to certain new and useful improvements in dental construction, and it relates more particularly to certain new and useful improvements in composite metal-and-porcelain crowns for teeth.

One phase of my invention is a method of attaching a dental porcelain front to a metal or alloy dental crown or shell, by anchoring, engaging, or embedding into the plastic porcelain (before baking) one or more integral welded, or soldered projections extending from the said metal dental crown or shell (into the porcelain).

An object of my invention is to provide a construction in such composite metal-and-porcelain dental crowns which will completely conceal the metal from front view and will be more durable and dependable than the constructions heretofore employed.

With the above and other objects in view which will appear more fully from the following more detailed description, one phase of my invention consists of a dental construction in which a dental crown is formed of a metallic shell adapted to surround the tooth (which has previously been properly prepared and reduced in size sufficiently to receive the crown), said shell having a front opening in which a porcelain face panel (preferably resting on a thin metal backing) is baked and held in position not merely by the metal boundary, but also locked in position by metallic anchorages, embedded in the porcelain itself, said anchorages being either integral or soldered or welded projections extending from the metallic shell which forms the balance of the composite metal-and-porcelain dental crown.

My invention may also include certain other novel features of construction in connection with such metal-and-porcelain dental crowns, all of which will appear more fully from the following detailed description.

For the purpose of illustrating my invention, I have shown in the accompanying drawing, one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawing in which like reference characters indicate like parts:

Figure 1 represents a perspective view of a composite metal-and-porcelain dental crown embodying my invention.

Figure 2 represents a similar perspective view of the metallic shell prior to adding and baking the porcelain faced panel.

Figure 3 represents a section generally on line 3—3 of Figure 1.

Figure 4 represents a section generally on line 4—4 of Figure 1.

Figure 5 represents a section generally on line 5—5 of Figure 1.

The composite metal-and-porcelain dental crown of my present invention is made by first forming a metallic dental crown of a shape and size to conform generally to the original shape and size of the tooth which is to be crowned, but having a front opening substantially the entire area of the front visible portion of the tooth;—said opening being generally designated by the numeral 6. The metallic crown 5 may naturally be of any suitable metallic material, such as platinum or of some metallic alloy suitable for this purpose. The metallic dental crown or shell is formed in the usual way in which metallic dental crowns are formed, but with the front opening 6 provided therein. The front opening 6 is thus bounded by the side portions 7 and 8 of the dental crown, the terminal tip portion 9 of the dental crown and the basal portion 10 which borders on the opening in a narrow band, as indicated particularly in Figures 1, 2, and 4. If desired, the basal band portion 10 may be omitted;—thus permitting the porcelain front panel to extend to the gum.

In one embodiment of my invention, I provide two or more prong-like anchorage members 11 adjacent to the opening 6 either formed integrally with the body of the dental crown or shell, or welded, soldered, or otherwise secured thereto. As shown in the drawing, the anchor members 11 are off-set inwardly with respect to the front plane of the shell, and the portions thereof adjacent the edges 7, 8 are doubly bent to be within the said edges.

A thin metal plate or sheet of metal 12 formed of platinum or other suitable metallic material or of some suitable alloy, is inserted within the shell or dental crown generally in registration with the front opening 6. In this condition, the plastic porcelain material, such as is used in the dental arts, is then placed into the opening in a layer of suitable thickness, and molded and shaped in place against the metallic backing plate 12;—the anchorage members 11 being thoroughly embedded in the porcelain layer. Thereafter the dental crown or shell 5 together with the metallic plate or backing 12 and the porcelain layer 13 are subjected to a baking operation in the usual manner employed in the dental arts for baking porcelain parts. Thereafter the metallic plate or backing 12 may either be removed or is preferably left in place and soldered along its edges to the corresponding interior portions of the metallic shell or dental crown 5, so as to form a completely sealed metallic body, thereby preventing the infiltration of moisture or foreign substance along the juncture lines between the porcelain and the metal crown or shell 5.

The metal plate or backing 12 may be soldered in place after the porcelain 13 has been baked by flowing a small quantity of gold, platinum or silver solder or the like, around the edges of the plate, thereby forming a hermetically sealed metallic wall all around the tooth with the porcelain face 13, exteriorly thereof but firmly anchored thereto. The thus completed composite metal-and-porcelain dental crown is then ready to be fitted on the prepared tooth in the usual manner and cemented in place by suitable cements used for that purpose.

It is also to be understood that the prong-like anchorages 11 may either be formed integrally with the shell 5 as stated, or they may be formed separately and then soldered or welded to the dental crown or shell 5. It is also to be understood that the layer 13 may be formed of any porcelain or porcelain-like material or other plastic material suitable for the dental construction.

It will be understood that while I have only shown two anchorages 11 (V shaped) on the two sides of the shell, this number may be varied, variously located and shaped variously. Thus, I may provide anchorages or prongs also at the top and bottom, or may provide two or more prongs on each side;—the location, number, and shape of the anchorages depending somewhat upon the character and size of the tooth, and also upon other considerations in the actual application.

It will be observed that the peripheral edges of the porcelain front extend behind and are slightly overlapped by the surrounding edges of the metallic shell portion thereby more firmly interlocking the entire metallic shell with the front porcelain face.

The metal backing plate directly behind the porcelain face may be of thinner metal than the body of the metallic shell, because, after the composite crown is installed upon the tooth and in place, this backing plate is not exposed and is not subjected to the same strain and wear that the exterior metallic parts are.

If the narrow band of metal 10 is omitted at the base of the crown, and the porcelain face extended in its place, then it may be desirable to provide additional anchorage members extending from each side of the shell into the porcelain immediately adjacent to or in close proximity to the basal terminus of the shell, so that these additional anchorages may form a continuous connection around the entire periphery of the composite crown near the basal portion of the crown.

I am aware that my invention may be embodied in other specific forms without departing from the spirit or essential attributes thereof, and I therefore desire the present embodiment to be considered in all respects as illustrative and not restrictive, reference being had to the appended claim rather than to the foregoing description to indicate the scope of the invention.

Having thus described my invention, what I hereby claim as new, and desire to secure by Letters Patent, is:

A dental construction adapted to be fitted over the exposed portion of a tooth and comprising a metallic shell having a front opening substantially coextensive with the visible portion of the tooth, a plurality of spaced anchor members extending laterally into said front opening and being formed integral with the vertical edges of said shell around the opening, said anchor members being offset inwardly with respect to the front plane of said shell and having the portions thereof adjacent said shell doubly bent and lying within the vertical edges of said shell around said opening whereby the free ends of said anchor members are disposed within said shell, and a porcelain facing closing said opening and held by said shell with said anchor members firmly embedded therein.

WILLIAM A. ZELESNICK.